(12) United States Patent
Bakshi et al.

(10) Patent No.: US 10,310,590 B2
(45) Date of Patent: Jun. 4, 2019

(54) ASYMMETRIC POWER STATES ON A COMMUNICATION LINK

(71) Applicant: QUALCOMM Incorporated, San Diego, CA (US)

(72) Inventors: William Bakshi, Ramat Gan (IL); Nabeel Achlaug, Kfar Kama (IL)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 15/449,209

(22) Filed: Mar. 3, 2017

(65) Prior Publication Data

US 2018/0253138 A1    Sep. 6, 2018

(51) Int. Cl.
| | |
|---|---|
| *G06F 1/32* | (2019.01) |
| *G06F 13/42* | (2006.01) |
| *G06F 1/3287* | (2019.01) |
| *G06F 13/40* | (2006.01) |
| *G06F 1/324* | (2019.01) |
| *G06F 1/3237* | (2019.01) |
| *G06F 1/3234* | (2019.01) |

(52) U.S. Cl.
CPC ............ *G06F 1/3287* (2013.01); *G06F 1/324* (2013.01); *G06F 1/3237* (2013.01); *G06F 1/3253* (2013.01); *G06F 13/4022* (2013.01); *G06F 13/4291* (2013.01); *G06F 13/4273* (2013.01); *Y02D 10/14* (2018.01); *Y02D 10/151* (2018.01)

(58) Field of Classification Search
CPC .................................. G06F 1/32; G06F 13/42
USPC ......................................................... 710/313
See application file for complete search history.

(56) References Cited

U.S. PATENT DOCUMENTS

| | | | | |
|---|---|---|---|---|
| 6,240,522 B1 * | 5/2001 | Stufflebeam | ........ | G06F 13/4054 713/324 |
| 6,296,938 B1 * | 10/2001 | Masaaki | .................. | C08K 9/06 428/404 |
| 6,697,885 B1 * | 2/2004 | Goodfellow | ............ | G06F 13/28 710/22 |

(Continued)

OTHER PUBLICATIONS

International Search Report and Written Opinion for PCT/US2018/019087, dated May 23, 2018, 15 pages.

(Continued)

*Primary Examiner* — Christopher B Shin
(74) *Attorney, Agent, or Firm* — Withrow & Terranova, PLLC (57) ABSTRACT

Asymmetric power states on a communication link are disclosed. In one aspect, the communication link is a Peripheral Component Interconnect (PCI) express (PCIe) link. PCIe is a point-to-point communication link between two termini. Exemplary aspects of the present disclosure allow the two termini to be in different power states. By allowing the two termini to be in the different power states, an individual terminus may be put into a low-power state even though the other terminus is maintained at a higher-power state. The different power states are enabled by providing switches between a reference clock and respective termini such that the reference clock may selectively be provided to only one terminus of the communication link, allowing that terminus to remain in the higher-power state while the other terminus enters a low-power state that does not require the reference clock.

9 Claims, 12 Drawing Sheets

(56) References Cited

U.S. PATENT DOCUMENTS

| | | |
|---|---|---|
| 7,698,489 B1 * | 4/2010 | Jacoby .................. G06F 1/3203 |
| | | 710/301 |
| 7,984,314 B2 | 7/2011 | Cooper et al. |
| 8,782,456 B2 | 7/2014 | Tan et al. |
| 8,862,920 B2 | 10/2014 | Branover et al. |
| 9,367,116 B2 | 6/2016 | Diefenbaugh et al. |
| 9,804,824 B1 * | 10/2017 | Ning ........................ G06F 5/12 |
| 2008/0120453 A1 * | 5/2008 | Nagasawa .............. H03K 17/22 |
| | | 710/305 |
| 2008/0162964 A1 | 7/2008 | Dahlen et al. |
| 2012/0005506 A1 * | 1/2012 | Walsh .................. G06F 1/3203 |
| | | 713/323 |
| 2014/0006670 A1 | 1/2014 | Wagh |
| 2014/0019788 A1 | 1/2014 | Fang et al. |
| 2014/0244889 A1 | 8/2014 | Sasson |
| 2015/0324318 A1 | 11/2015 | Tresidder |
| 2016/0092357 A1 | 3/2016 | Rehana et al. |
| 2017/0269675 A1 * | 9/2017 | Klacar .................. G06F 1/3215 |
| 2017/0285726 A1 * | 10/2017 | Ito ......................... G06F 1/3284 |

OTHER PUBLICATIONS

Author Unknown, "L1 PM Substates with CLKREQ, Revision 1.0a," PCI-SIG Engineering Change Notice, May 31, 2013, 33 pages.

Author Unknown, "PCI Express® Base Specification," PCI Express, Revision 3.0, Nov. 10, 2010, 860 pages.

* cited by examiner

ASYMMETRIC POWER STATES ON A COMMUNICATION LINK

BACKGROUND

I. Field of the Disclosure

The technology of the disclosure relates generally to a Peripheral Component Interconnect (PCI) express (PCIe) link and more particularly to controlling power states for termini associated with a PCIe link.

II. Background

Computing devices have become common throughout modern society. The popularity of computing devices is propelled, in part, by the increased functionality and power of the computing devices. The diverse functionality and increased power is provided by the ability of the processing unit to communicate with diverse peripherals. These peripherals, such a wireless modem or a graphics card, may be internal to a computing device, or peripherals such as a display, a sensor, or the like may be external to the computing device.

To achieve this myriad functionality, various communication protocols and standards have evolved that allow integrated circuits (ICs) to communicate with one another. One popular communication standard is the Peripheral Component Interconnect (PCI) standard, which has a variety of permutations. One of the most popular permutations of the PCI standard is the PCI express (PCIe) standard.

While the PCIe standard is well suited for a variety of uses, including in mobile computing devices such as smart phones, tablets, laptops and the like, mobile computing devices face additional challenges. In particular, mobile computing devices typically rely on batteries to provide power for the circuits that enable the various functions. The more functions, and the faster the functions are performed, the greater the drain on the battery, which shortens the time available between needing to recharge the battery. In response to consumer demand for better battery utilization, designers have implemented a variety of low-power modes for various circuits and communication links. By placing ICs in low-power modes, less power is consumed and battery life extended. The PCIe standard has various low-power modes (LPM), including L1, L1.1, and L1.2 (sometimes referred to as L1ss with reference to L1.1 and L1.2 generically). While effective at reducing power consumption, there remains pressure to reduce power consumption further.

SUMMARY OF THE DISCLOSURE

Aspects disclosed in the detailed description include asymmetric power states on a communication link. In a particularly contemplated aspect, the communication link is a Peripheral Component Interconnect (PCI) express (PCIe) link. PCIe is a point-to-point communication link between two termini. Exemplary aspects of the present disclosure allow, contrary to current power state voting rules, the two termini to be in different power states. By allowing the two termini to be in the different power states, an individual terminus may be put into a low-power state even though the other terminus is maintained at a higher-power state. The different power states are enabled by providing switches between a reference clock and respective termini such that the reference clock may selectively be provided to only one terminus of the communication link, allowing that terminus to remain in the higher-power state while the other terminus enters a low-power state that does not require the reference clock. Allowing the two termini to be in the different power states allows greater power savings than that afforded by symmetric power states.

In this regard in one aspect, a peer-to-peer PCIe system is disclosed. The peer-to-peer PCIe system includes a PCIe bus. The peer-to-peer PCIe system also includes a first link terminus. The first link terminus includes a first physical layer (PHY) coupled to the PCIe bus. The peer-to-peer PCIe system also includes a second link terminus. The second link terminus includes a second PHY coupled to the PCIe bus. The peer-to-peer PCIe system also includes a reference clock configured to provide a reference clock signal to the first link terminus and to the second link terminus. The peer-to-peer PCIe system also includes a first switch associated with the reference clock configured to stop sending the reference clock signal to one of the first link terminus and the second link terminus while maintaining provision of the reference clock signal to the other one of the first link terminus and the second link terminus.

In another aspect, a method of controlling a peer-to-peer PCIe link comprising two PCIe termini connected by a direct PCIe link in low-power states is disclosed. The method includes receiving a vote from a first of the two PCIe termini to enter a low-power state. The method also includes not receiving a vote from a second of the two PCIe termini to enter the low-power state. The method also includes instructing the first of the two PCIe termini to enter the low-power state. The method also includes providing a reference clock signal to the second of the two PCIe termini without providing the reference clock signal to the first of the two PCIe termini.

In another aspect, a reference clock circuit is disclosed. The reference clock circuit includes a clock source configured to produce a reference clock signal at a clock node. The reference clock circuit also includes a first switch coupled to the clock node. The first switch is configured to be controlled by a first clock request signal from a root complex. The reference clock circuit also includes a second switch coupled to the clock node. The second switch is configured to be controlled by a second clock request signal from an endpoint. The reference clock circuit also includes a first interface electrically connected to the first switch and configured to be coupled to the root complex. The reference clock circuit also includes a second interface electrically connected to the second switch and configured to be coupled to the endpoint.

In another aspect, a PCIe root complex is disclosed. The PCIe root complex includes a PHY configured to be coupled to a PCIe link. The PCIe root complex also includes a control system operatively coupled to the PHY. The control system is configured to, relative to an associated endpoint, asymmetrically enter a low-power state by voting to enter the low-power state, determining that the associated endpoint is not ready to enter the low-power state, and entering the low-power state while continuing to provide a reference clock signal to the associated endpoint. The control system is also configured to, relative to the associated endpoint, asymmetrically avoid entrance into the low-power state while instructing the associated endpoint to enter the low-power state by receiving a vote from the associated endpoint to enter the low-power state and instructing the associated endpoint to enter the low-power state while continuing to provide the reference clock signal to a PCIe root complex.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include asymmetric power states on a communication link. In a particularly contemplated aspect, the communication link is a Peripheral Component Interconnect (PCI) express (PCIe) link. PCIe is a point-to-point communication link between two termini. Exemplary aspects of the present disclosure allow, contrary to current power state voting rules, the two termini to be in different power states. By allowing the two termini to be in the different power states, an individual terminus may be put into a low-power state even though the other terminus is maintained at a higher-power state. The different power states are enabled by providing switches between a reference clock and respective termini such that the reference clock may selectively be provided to only one terminus of the communication link, allowing that terminus to remain in the higher-power state while the other terminus enters a low-power state that does not require the reference clock. Allowing the two termini to be in the different power states allows greater power savings than that afforded by symmetric power states.

Before addressing the particular structures and methods of the present disclosure, a brief overview of a computing device having PCIe links is discussed with reference to FIG. 1, and the various details of a conventional PCIe system are provided with reference to FIGS. 2A-2C, 3, and 4. A description of exemplary aspects of the present disclosure begins below with reference to FIG. 5A.

Figure 1:
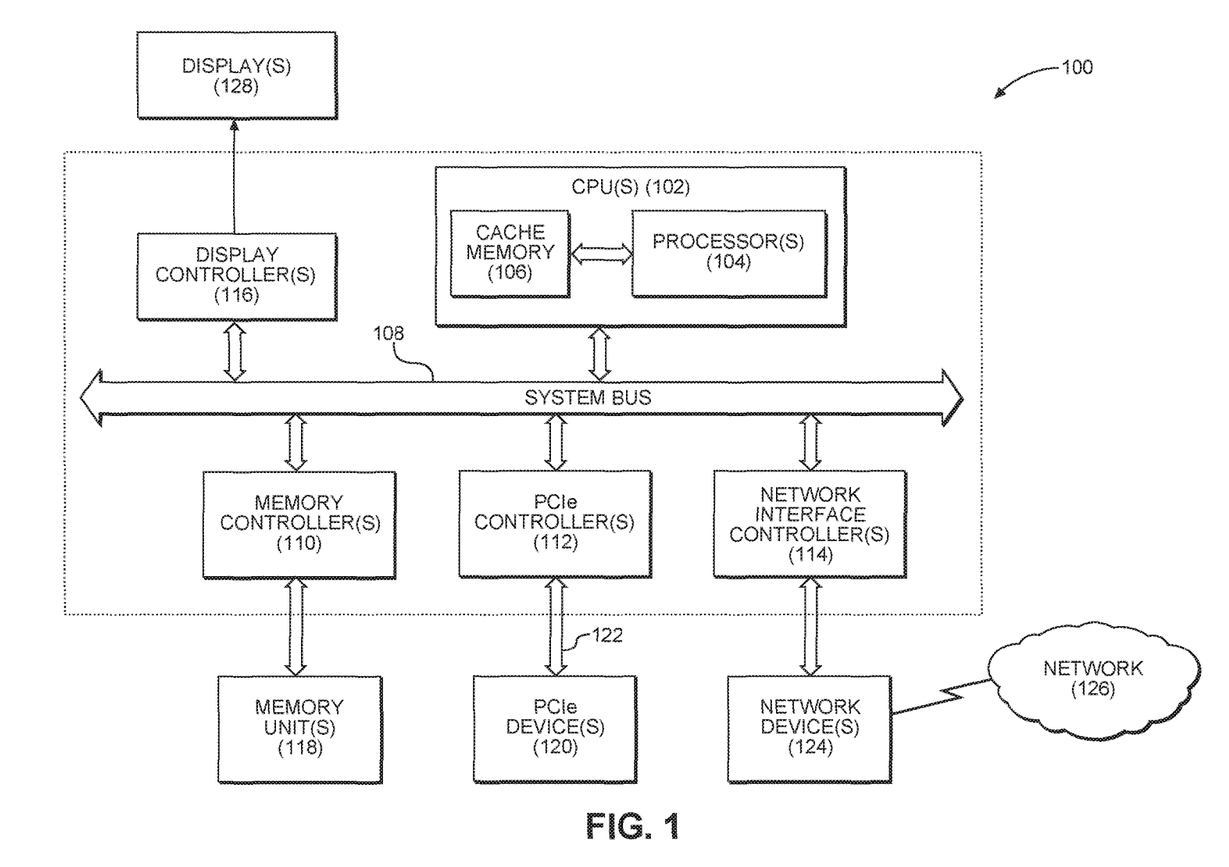
FIG. 1 is a block diagram of an exemplary computing device that may include a Peripheral Component Interconnect (PCI) express (PCIe) link having asymmetric power states.

In this regard, FIG. 1 illustrates an example of a computing device, namely a processor-based system 100 that can employ PCIe links able to operate in asymmetric power states or modes according to exemplary aspects of the present disclosure. In this example, the processor-based system 100 includes one or more central processing units (CPUs) 102, each including one or more processors 104. The CPU(s) 102 may have cache memory 106 coupled to the processor(s) 104 for rapid access to temporarily stored data. The CPU(s) 102 is coupled to a system bus 108 and can intercouple master and slave devices included in the processor-based system 100. As is well known, the CPU(s) 102 communicates with these other devices by exchanging address, control, and data information over the system bus 108. For example, the CPU(s) 102 can communicate bus transaction requests to one or more memory controllers 110. Although not illustrated in FIG. 1, multiple system buses 108 could be provided.

Other devices can be connected to the system bus 108. As illustrated in FIG. 1, these devices can include the memory controller(s) 110, one or more PCIe controllers 112, one or more network interface controllers 114, and one or more display controllers 116, as examples. The memory controller(s) 110 may be coupled to one or more memory units 118. The PCIe controller(s) 112 may be coupled to one or more PCIe devices 120 through one or more PCIe links 122. The network interface controller(s) 114 may be coupled to one or more network devices 124. The network device(s) 124 can be any device configured to allow exchange of data to and from a network 126. The network 126 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 124 can be configured to support any type of communications protocol desired.

The CPU(s) 102 may also be configured to access the display controller(s) 116 over the system bus 108 to control information sent to one or more displays 128. The display controller(s) 116 sends information to the display(s) 128 to be displayed via one or more video processors (not illustrated), which process the information to be displayed into a format suitable for the display(s) 128. The display(s) 128 can include any type of display, including, but not limited to, a cathode ray tube (CRT), a liquid crystal display (LCD), a plasma display, a light emitting diode (LED) display, etc.

Figure 2A:
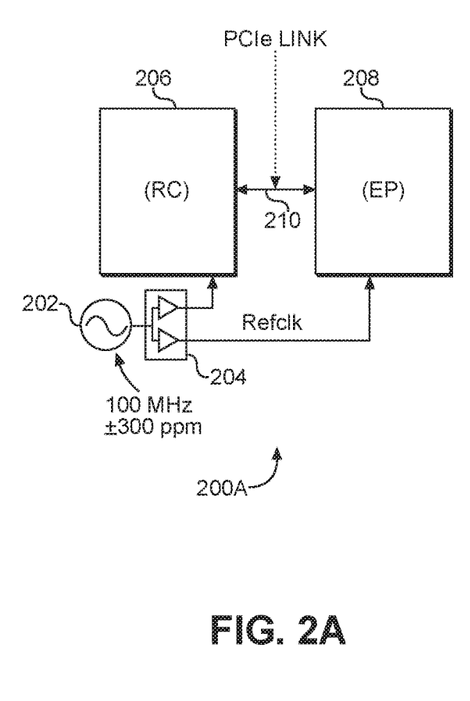
FIGS. 2A-2C illustrate three conventional ways reference clocks are provided to termini associated with conventional PCIe links.
Figure 2B:
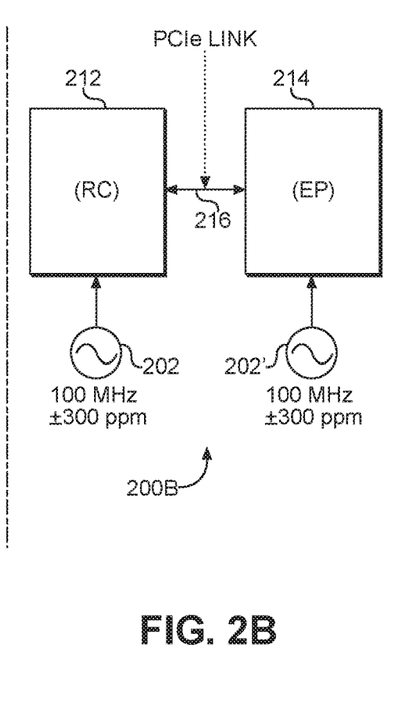
Figure 2C:
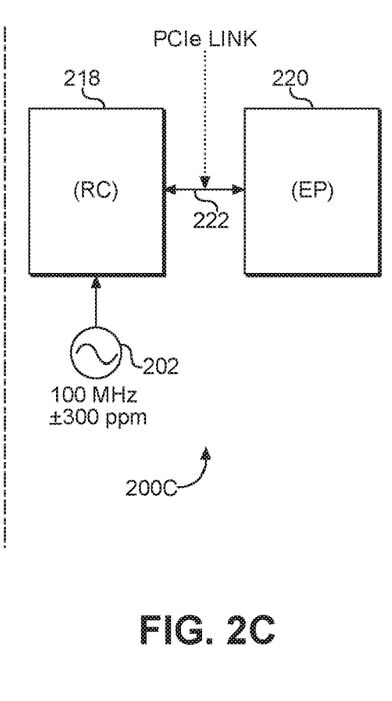

While the concepts of the present disclosure may be applied to other types of communication links, exemplary aspects of the present disclosure are well suited for use with the PCIe link(s) 122. To better understand the present disclosure, exemplary aspects of the present disclosure are contrasted against a conventional PCIe link and, in particular, how a reference clock is provided to termini of a PCIe link. Thus, FIGS. 2A-2C illustrate three conventional clocking architectures used to deliver the reference clock to the termini of the PCIe link. In particular, FIG. 2A illustrates a common reference clock system 200A; FIG. 2B illustrates a separate reference clock system 200B; and FIG. 2C illustrates a data clocked reference clock system 200C. It should be appreciated that the PCIe standard sets the reference clock at 100 MHz with an accuracy of greater than ±300 parts per million (ppm). As applied to a frequency, this is the difference in millionths of a Hertz, between a stated ideal frequency, and the measured, long-term average of a frequency. While variations are permitted for field programmable gate array (FPGA) implementations, for the sake of simplicity, it will be assumed that reference clock 202 is a 100 MHz clock source. In the common reference clock system 200A of FIG. 2A, the reference clock 202 provides a reference clock signal (sometimes referred to as Refclk) to a splitter 204 that splits the Refclk and provides the Refclk to a first terminus 206, which may be a PCIe root complex (sometimes referenced in the drawings as RC), and a second terminus 208, which may be a PCIe endpoint (sometimes referenced in the drawings as EP). The first terminus 206 is communicatively coupled to the second terminus 208 by a PCIe link 210. The Refclk may be provided to both the termini 206 and 208 through wiring that is independent of the PCIe link 210 or may be provided on a dedicated clock lane within the PCIe link 210.

In the separate reference clock system 200B of FIG. 2B, the reference clock 202 is only coupled to a first terminus 212 and a second reference clock 202' is coupled to a second terminus 214. The first terminus 212 and the second terminus 214 are coupled by a PCIe link 216. The second reference clock 202' may be within an integrated circuit (IC) containing the second terminus 214 or external thereto.

In the data clocked reference clock system 200C of FIG. 2C, the reference clock 202 is provided to a first terminus 218. The first terminus 218 is communicatively coupled to a second terminus 220 through a PCIe link 222. The first terminus 218 encodes the Refclk into a data stream passed to the second terminus 220, and the second terminus 220 extracts the Refclk from the data stream.

Conventional PCIe systems such as the reference clock systems 200A, 200B, and 200C require that each terminus (e.g., the termini 206 and 208) vote to enter a low-power mode or state. The reference clock 202 (and 202') remains on so long as either one of the termini require the reference clock signal. Note that the PCIe standard disallows entrance into a low-power mode L1ss if both sides of the PCIe link do not support such voting and/or if both sides do not support shutting down the reference clock.

Figure 3:
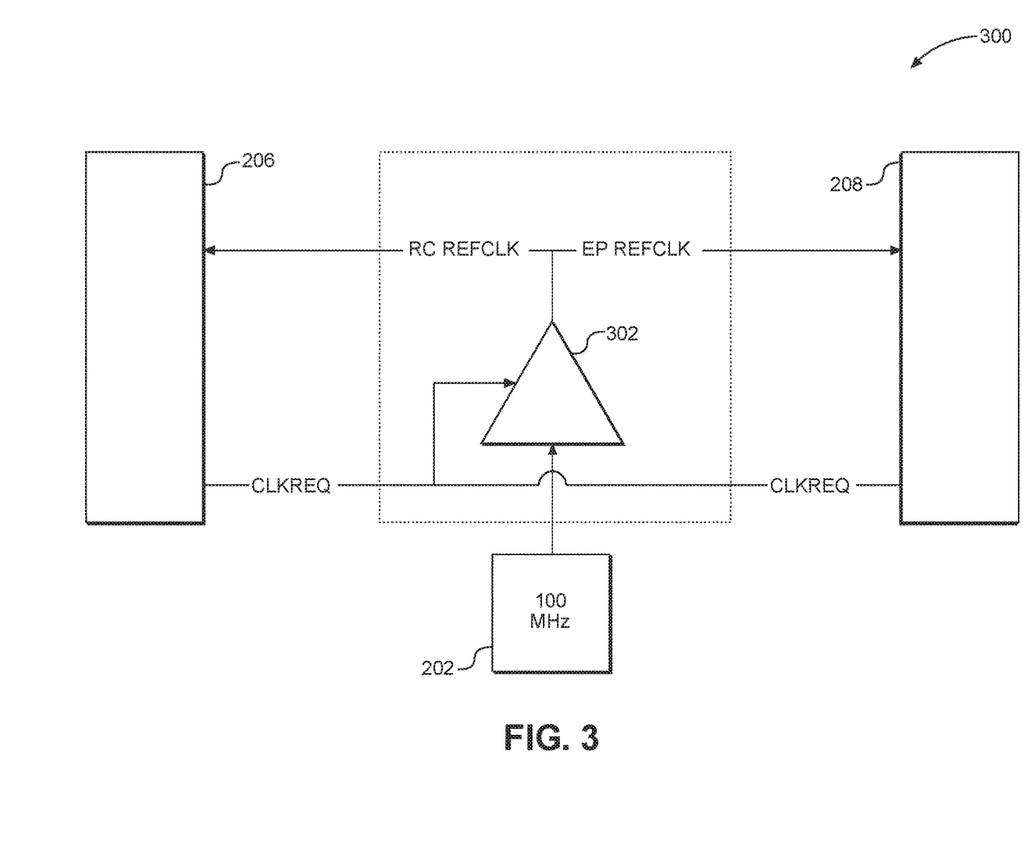
FIG. 3 illustrates a simplified block diagram of a conventional switching circuit though which a reference clock is provided to respective termini associated with a conventional PCIe link.

The voting is accomplished through a command called CLKREQ (clock request), which controls a master switch as illustrated in FIG. 3. In this regard, FIG. 3 illustrates a switch circuit 300 that may reside within the splitter 204 of the common reference clock system 200A of FIG. 2A. The switch circuit 300 receives the Refclk from the reference clock 202. The Refclk is passed to a switch 302. The switch 302 is controlled by CLKREQ signals from the termini 206 and 208. Based on whether the switch 302 is open or closed, the Refclk is provided to both the first terminus 206 and the second terminus 208.

Figure 4:
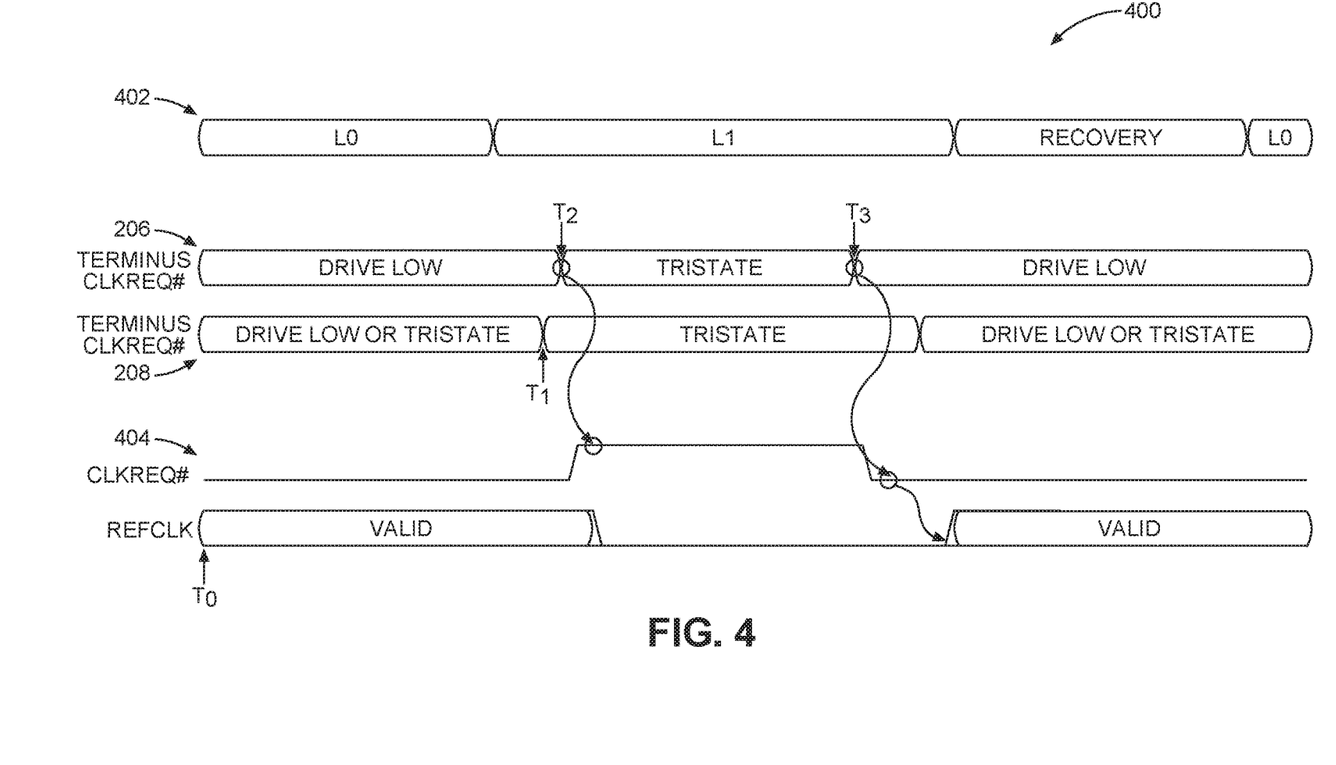
FIG. 4 illustrates a signal flow diagram by which a conventional PCIe link allows termini to enter a low-power state.

FIG. 4 illustrates a signal flow diagram 400 representing how the termini 206 and 208 of FIG. 2A enter and exit low-power states with reference to operation of the reference clock signal. In particular, line 402 represents the power mode of the first terminus 206 as it transitions from normal operation L0 to L1, which is a low-power mode, and back out into recovery mode. Initially, at time T0, the first terminus 206 drives CLKREQ line 404 low. Similarly, the second terminus 208 also drives the CLKREQ line 404 low or allows it to be in "Tristate" as defined by the PCIe L1ss specification. While the CLKREQ line 404 is low, the reference clock 202 produces the Refclk (i.e., the Refclk is "valid"). At time T1, the second terminus 208 switches to "Tristate," and subsequently at time T2, the first terminus 206 switches to "Tristate" indicating that neither the first terminus 206 nor the second terminus 208 requires the Refclk. Thus, the CLKREQ line 404 is allowed to rise, and the Refclk becomes invalid as the reference clock 202 is turned off. At time T3, the first terminus 206 again drives the CLKREQ line 404 low, and the reference clock is turned back on such that the Refclk is valid again. While not explicitly illustrated, so long as either the first terminus 206 or the second terminus 208 drives the CLKREQ line 404 low, the reference clock 202 remains on and continues to provide both the termini 206 and 208 the Refclk. While the termini 206 and 208 receive the Refclk, the termini 206 and 208 do not enter the low-power mode and power is consumed, potentially unnecessarily.

Exemplary aspects of the present disclosure allow termini of a PCIe link to have asymmetric power states. While the reference clock is still active, one terminus may enter a low-power state or mode, even though voting would otherwise indicate that the system stay in a higher-power state. It should be appreciated that this disclosure applies to two termini of a direct PCIe link and is not directed to a PCIe system that has an intermediate switch. That is, exemplary aspects of the present disclosure are provided in a peer-to-peer system, not a multi-peer system.

To effectuate a PCIe link that allows the termini thereof to be in different power states, exemplary aspects of the present disclosure provide a switching circuit having two independently controllable switches, one for each terminus of the PCIe link, that selectively gate provision of the reference clock to the respective termini. Once the reference clock signal is no longer provided to one terminus of the PCIe link, that terminus may enter a low-power state while the other terminus continues to receive the reference clock signal and operates at a higher-power state.

Figure 5A:
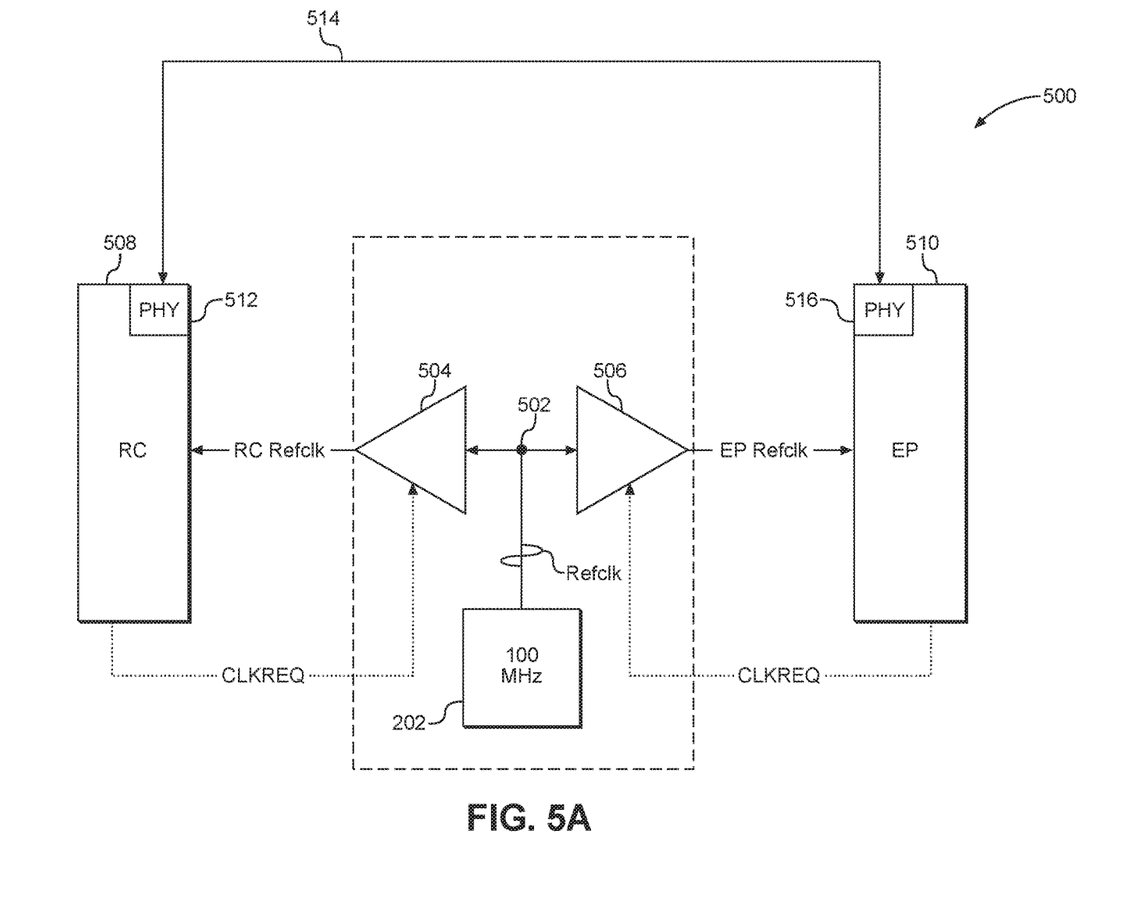
FIG. 5A is a simplified block diagram of a switching circuit that allows asymmetric power states between termini of a PCIe link.

In this regard, FIG. 5A illustrates an exemplary switching circuit 500. The switching circuit 500 may include the reference clock 202 of FIG. 2A. The Refclk is provided to a node 502 and, from the node 502, to a first switch 504 and a second switch 506. The first switch 504 and the second switch 506 may each include a buffer with a switch or may be a simple transistor switch. The first switch 504 is controlled by a CLKREQ signal from a first terminus 508, which, as illustrated, is a root complex (RC) terminus. The first terminus 508 thus selectively receives a root complex reference clock signal (RC Refclk in the drawings). Similarly, the second switch 506 is controlled by a CLKREQ signal from the second terminus 510, which, as illustrated, is an endpoint (EP) terminus. The second terminus 510 thus selectively receives an endpoint reference clock signal (EP Refclk in the drawings). It should be appreciated that there may be respective interfaces associated with the switches 504 and 506 that couple the switches to the respective termini 508 and 510.

Figure 5B:
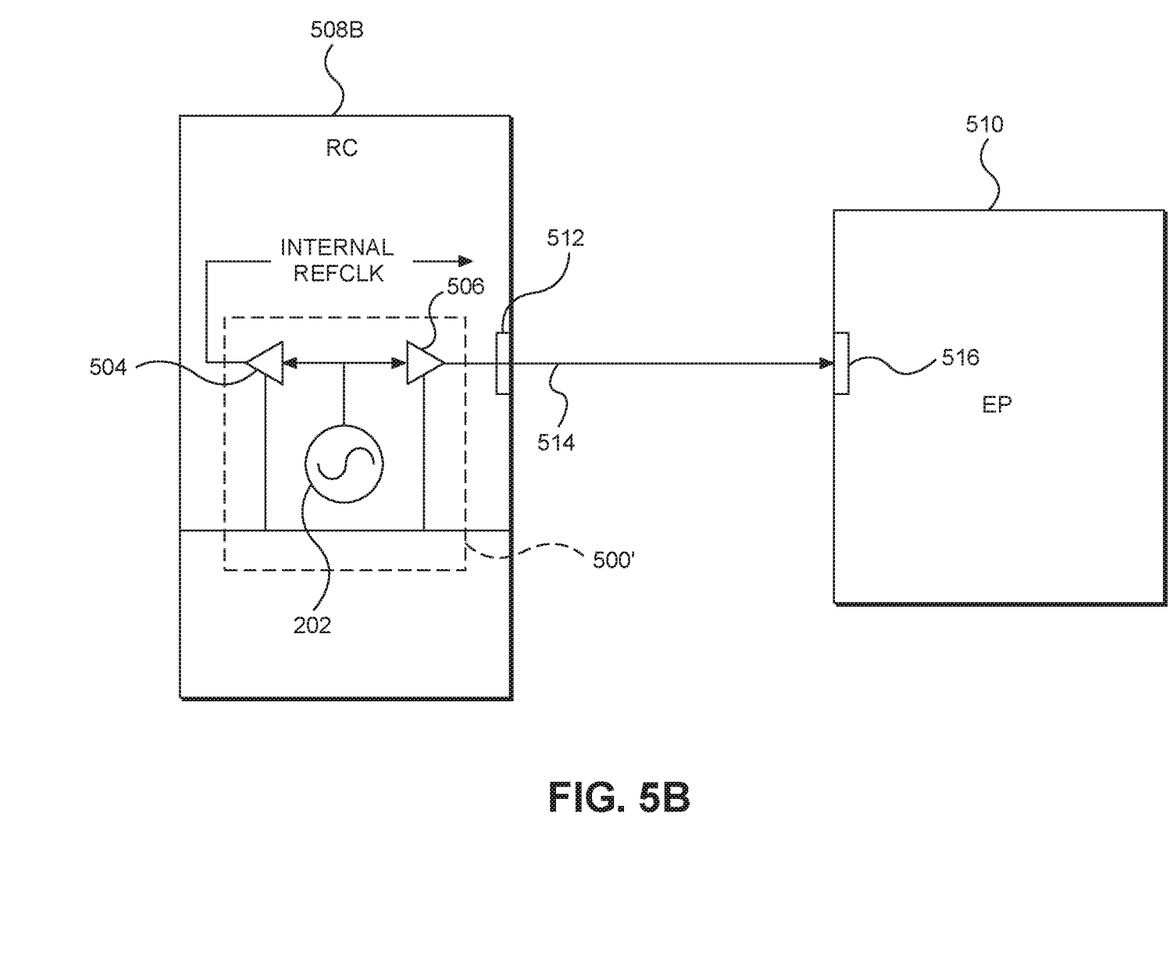
FIG. 5B is a simplified block diagram of a switching circuit within a root complex of a PCIe link that allows asymmetric power states.

As illustrated in FIG. 5A, the switching circuit 500 is positioned externally relative to either the first terminus 508 or the second terminus 510. As illustrated in FIG. 5B, a switching circuit 500' is positioned within a terminus 508B, which may be the root complex.

In either aspect (i.e., FIG. 5A or FIG. 5B), the first terminus 508 includes a physical layer (PHY) 512 coupled to a PCIe bus 514. The PCIe bus 514 is likewise coupled to a PHY 516 within the second terminus 510.

In an exemplary aspect, the reference clock 202 may be a crystal oscillator or a delay-locked loop (DLL) based on a system clock signal or the like. Still other clock sources may be used without departing from the scope of the present disclosure.

Note that it is possible to continue provide the reference clock to the PHY of a terminus while allowing processing elements of the terminus to enter a low-power state. Such may be appropriate when a PHY needs the reference clock but the processing elements may be forced into a low-power state. Note further that in systems where the root complex completely governs the PCIe link, the root complex terminus can use knowledge about the PCIe link to shut down the reference clock. For example, the root complex could control the PCIe link such that the endpoint does not send data without permission from the root complex. In such an instance, the root complex can force the reference clock to shut down and both ends of the PCIe link to enter a low-power state.

Figure 6A:
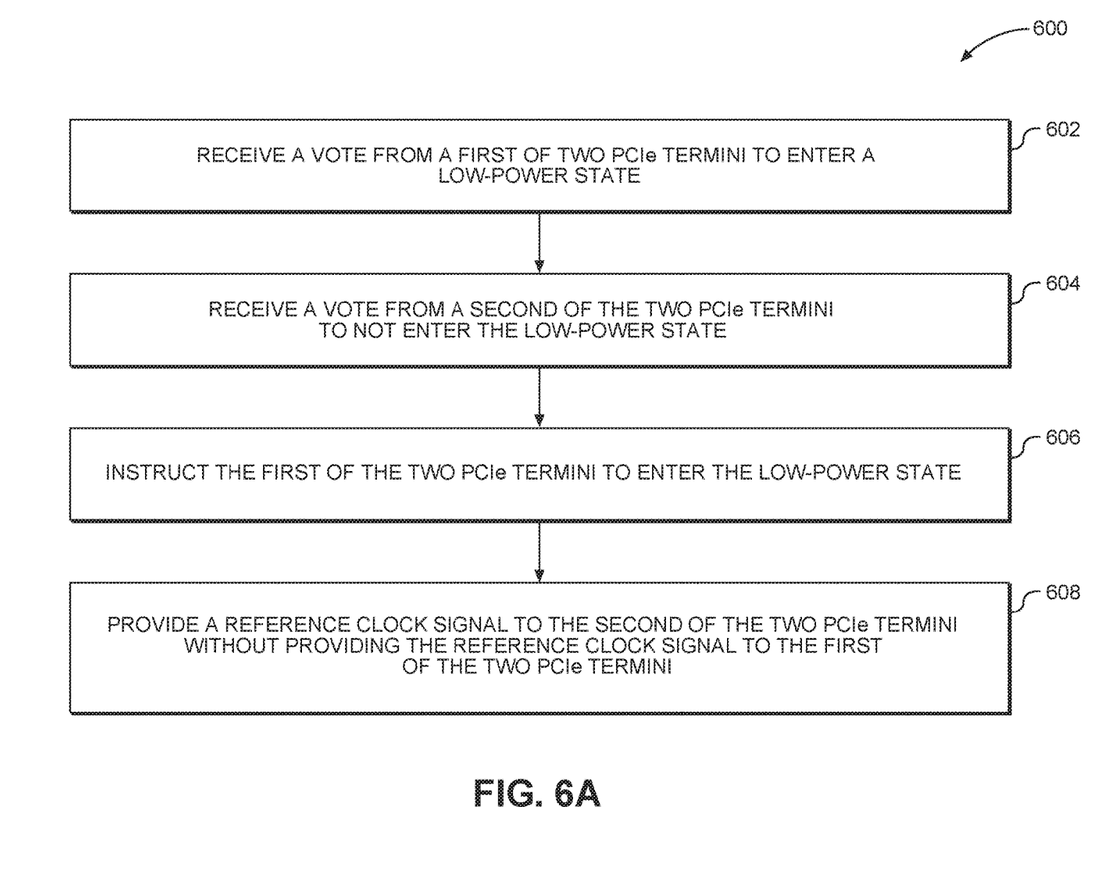
FIG. 6A is a generalized flowchart illustrating an exemplary process for different termini of a PCIe link to enter asymmetric low-power states.

FIG. 6A provides a simplified flowchart relating to a generalized process 600 associated with the asymmetric power states on a communication link according to an exemplary aspect of the present disclosure. The process 600 begins by providing a peer-to-peer PCIe link having a first terminus and a second terminus, where there is a first switch positioned between the reference clock and the first terminus and a second switch positioned between the reference clock and the second terminus. Once the circuits of the present disclosure are provided, the process 600 continues by receiving a vote from a first of two PCIe termini to enter a low-power state (block 602). While the first of the two PCIe termini is voting to enter a low-power state, a second of the two PCIe termini is voting to not enter the low-power state (block 604). It should be appreciated that either the root complex can vote to enter the low-power state or the endpoint can vote to enter the low-power state while the other does not vote to enter the low-power state. The root complex may then instruct the first of the two PCIe termini to enter the low-power state (block 606). While the first of the two PCIe termini enters the low power state, the peer-to-peer PCIe link continues to provide a reference clock signal to the second of the two PCIe termini without providing the reference clock signal to the first of the two PCIe termini (block 608). Providing the reference clock signal is accomplished by opening one of the switches and maintaining the other switch closed.

Figure 6B:
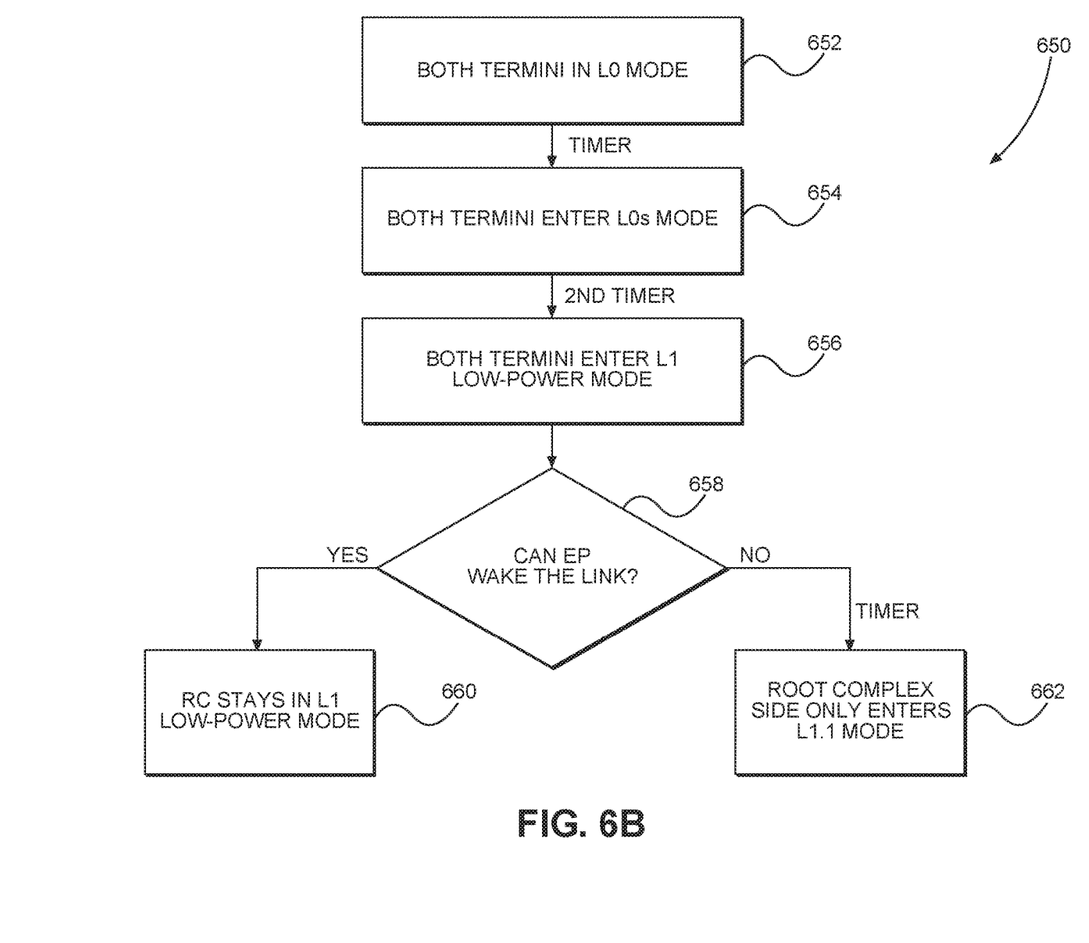
FIG. 6B is a more specific flowchart illustrating a process through which a root complex of a PCIe link may asymmetrically enter a low-power state depending on endpoint functionality.

In a more specific aspect, a process 650 is provided in FIG. 6B. The process 650 begins with both termini in an L0 mode (block 652). After a predetermined timer expires, the termini may enter an L0 standby (L0s) mode (block 654). After expiration of a second predetermined timer in the L0s mode, the termini may enter an L1 low-power mode (block 656). Entry into the L0s mode and the L1 low-power mode occurs according to the PCIe standard. At this point, the root complex terminus determines (or has previously determined) whether the endpoint terminus can wake the link 514 (block 658). If the answer is yes, the endpoint terminus can wake the link 514, then the root complex needs to stay in the L1 low-power mode the L1 low-power mode and can enter an L1.1 mode (block 662) even if the endpoint terminus has not voted to enter a lower-power state.

Figure 7A:
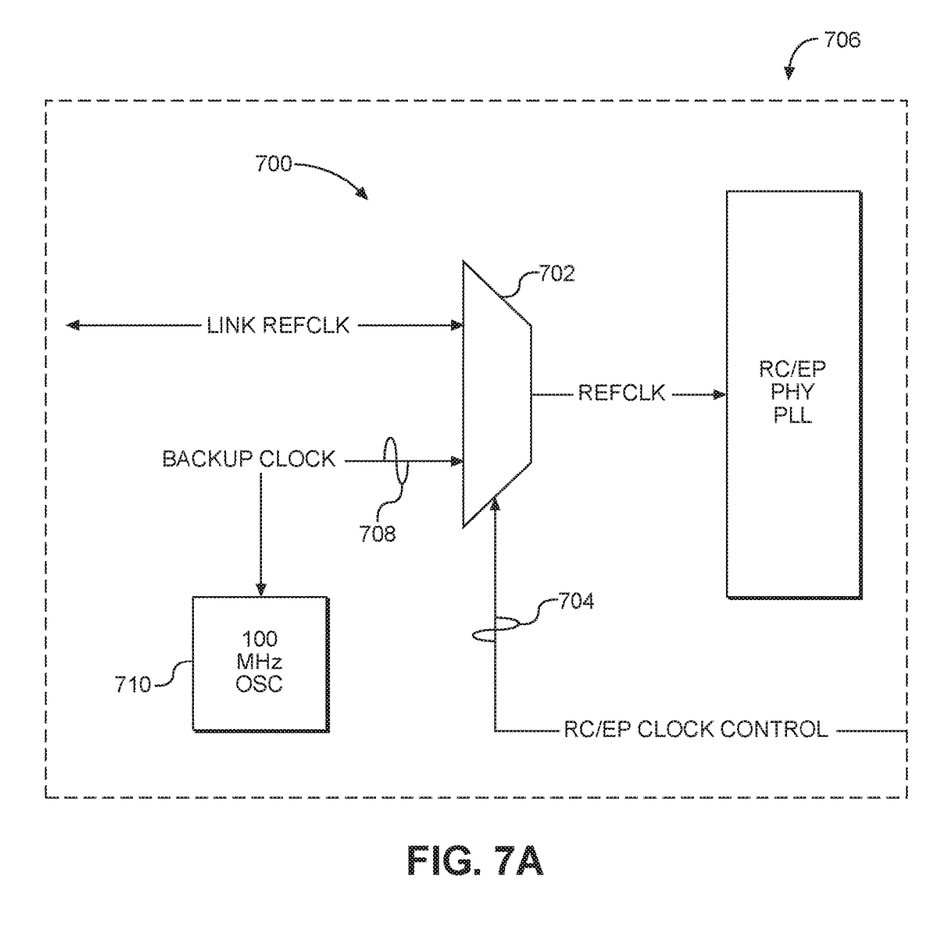
FIG. 7A is a simplified block diagram of a backup clock circuit that may be used to maintain a reference clock at a terminus of a PCIe link when asymmetric power states are used.

In an alternate exemplary aspect, one of the two PCIe termini may have its own internal backup clock. The controller of such terminus may support the absence of the reference clock signal, but allows for either type of PHY (i.e., a PHY that tolerates the absence of the reference clock signal or a PHY that requires the reference clock signal). Instead of shutting down the reference clock signal, when such terminus sends a CLKREQ signal, an internal switch switches from the reference clock signal to a backup clock. A generalized exemplary backup clock circuit 700 is provided with reference to FIG. 7A. The backup clock circuit 700 includes a switch 702 that receives a clock control signal 704 from a control system (not illustrated) of a terminus 706. The switch 702 either uses the reference clock signal from the reference clock 202 (not illustrated in FIG. 7A) or uses a backup clock signal 708 from a backup clock 710. By providing the backup clock 710, the other side of the PCIe link can exercise regular low-power state entry and exit with complete shutdown of the reference clock 202. The switch 702 can be internal to the terminus 706 or external therefrom.

Figure 7B:
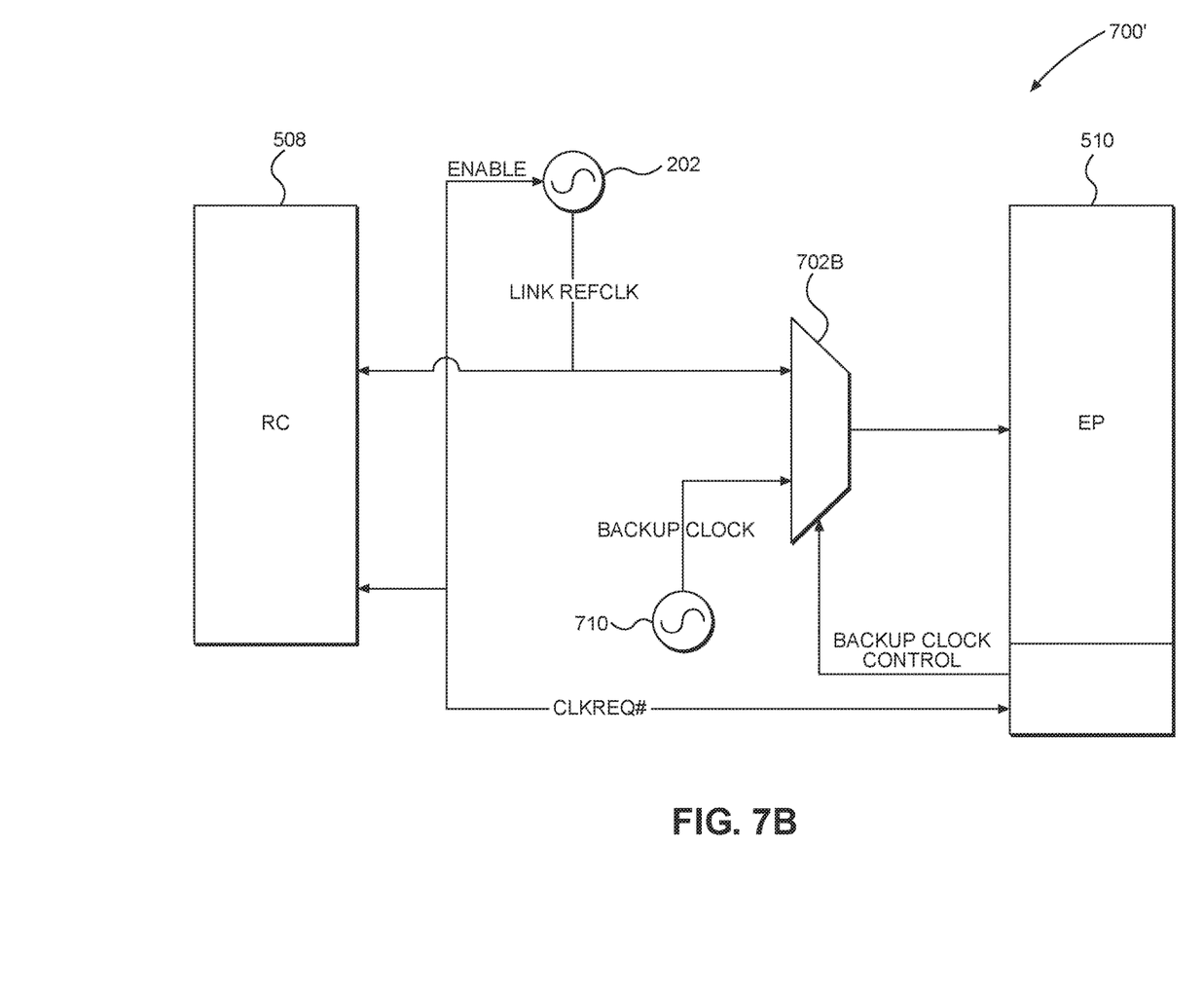
FIG. 7B is a simplified block diagram of the backup clock circuit of FIG. 7A operating specifically for an endpoint of the PCIe link.

A more specific backup clock circuit 700' is provided in FIG. 7B where the backup clock circuit 700' is operative to provide the backup clock 710 to the endpoint terminus 510. In particular, the reference clock 202 and the backup clock 710 are provided to a multiplexer 702B that outputs one or the other clock signal to the endpoint terminus 510. The root complex terminus 508 does not need a constant clock and thus may use the reference clock 202 as needed or may enter a low-power state asymmetrically as described above.

Figure 7C:
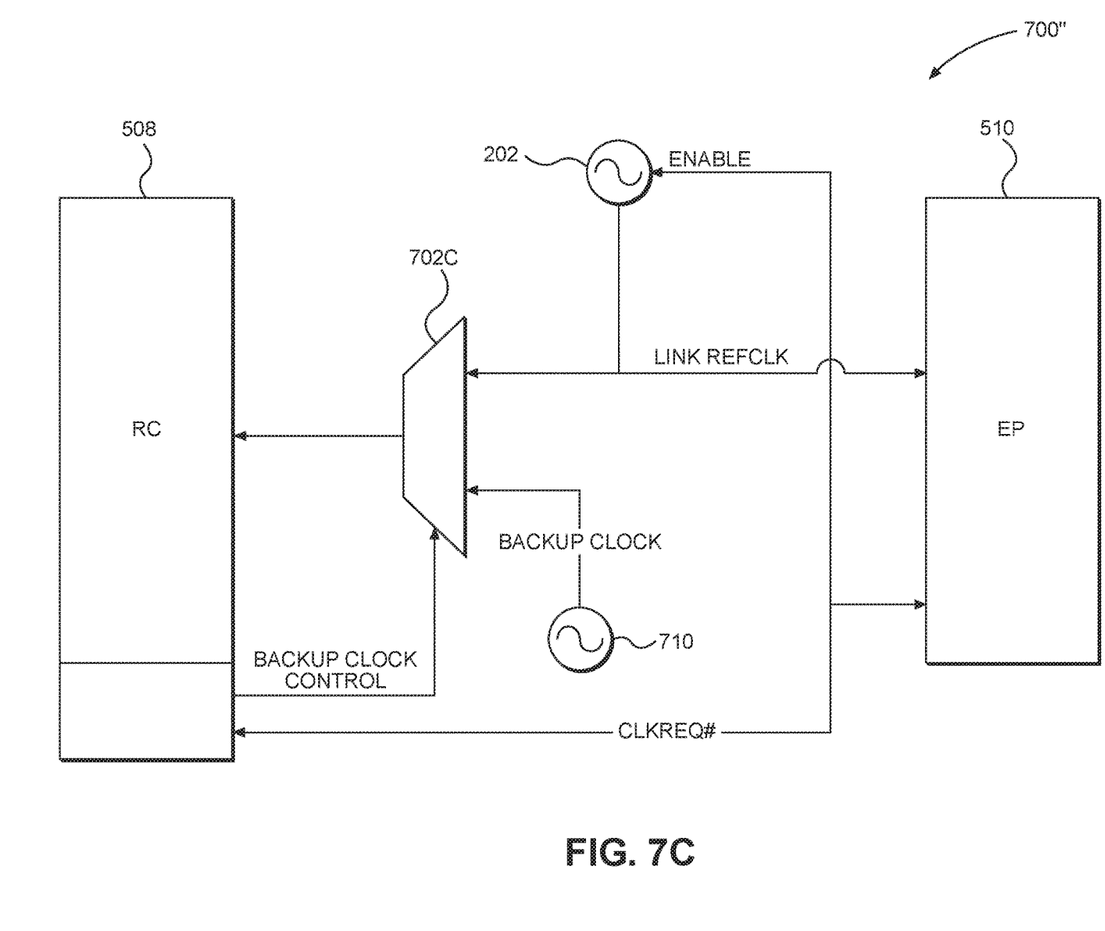
FIG. 7C is a simplified block diagram of the backup clock circuit of FIG. 7A operating specifically for a root complex of the PCIe link.

Similarly, FIG. 7C illustrates another backup clock circuit 700'' where the backup clock 710 is provided to the root complex terminus 508 through a multiplexer 702C.

Figure 8:
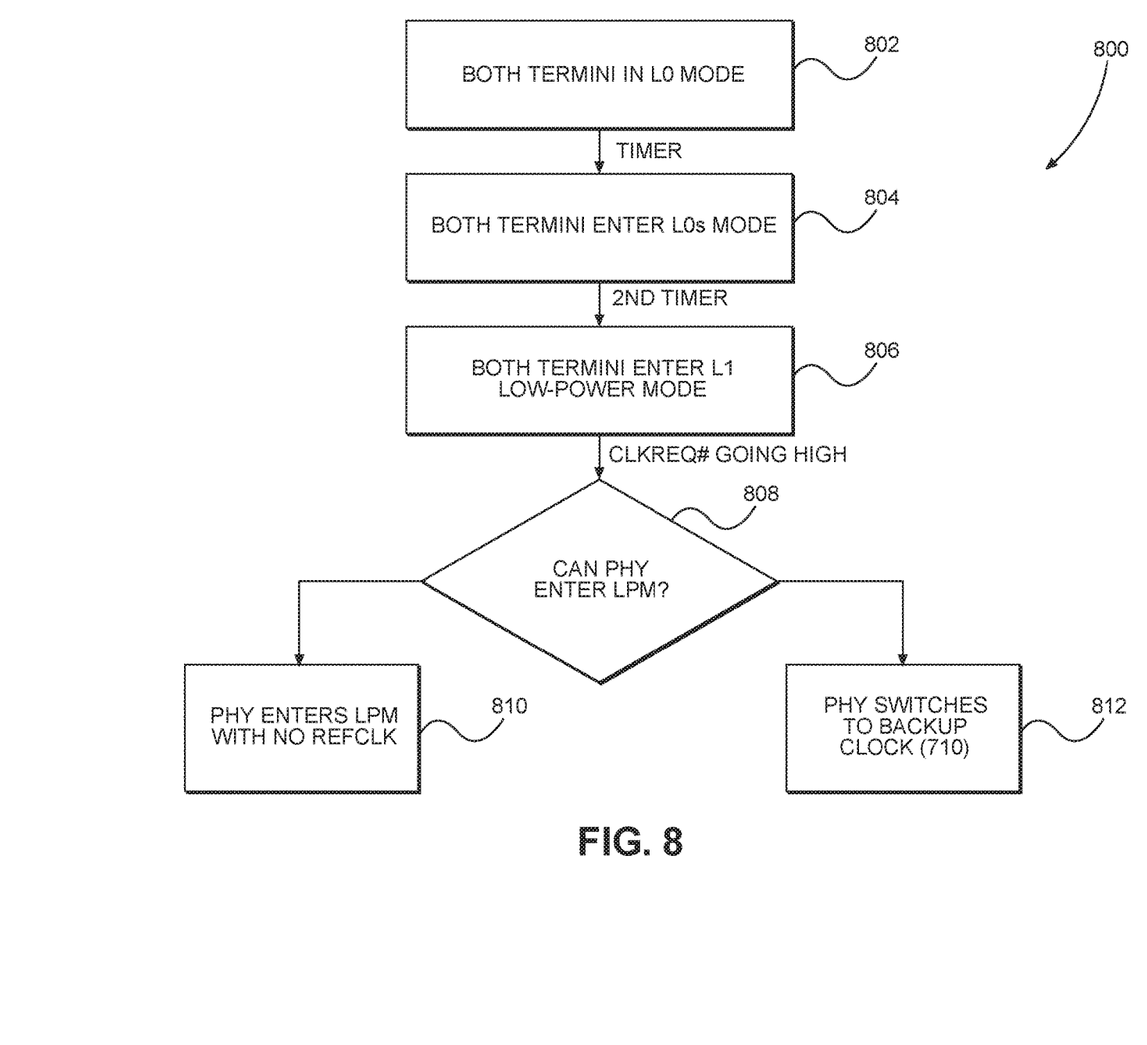
FIG. 8 is a flowchart illustrating a process where PCIe link termini may asymmetrically enter a low-power state using one of the backup clock circuits of FIGS. 7A-7C.

Use of the backup clock 710 is described in a process 800 illustrated in FIG. 8. As with the process 650 of FIG. 6B, in the process 800, both termini begin in an L0 mode (block 802). After a predetermined timer expires, the termini may enter an L0 standby (L0s) mode (block 804). After expiration of a second predetermined timer in the L0s mode, the termini may enter an L1 low-power mode (block 806). Entry into the L0s mode and the L1 low-power mode occurs according to the PCIe standard. At this point, the termini determine (or have previously determined) whether the corresponding PHY 512 or 516 can enter a lower-power mode (referenced as "LPM" in the drawings) (block 808). If the answer is yes, the entire terminus, including the corresponding PHY, enters the lower-power mode with no REFCLK (block 810). If however, the answer to block 808 is no, the PHY cannot enter the lower-power mode, then the PHY switches to the backup clock 710 (block 812).

The asymmetric power states on a communication link according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A peer-to-peer Peripheral Component Interconnect (PCI) express (PCIe) system, comprising:
   a PCIe bus;
   a first link terminus comprising:
      a first physical layer (PHY) coupled to the PCIe bus;
   a second link terminus comprising:
      a second PHY coupled to the PCIe bus;
   a reference clock configured to provide a reference clock signal to the first link terminus and to the second link terminus; and
   a first switch associated with the reference clock configured to stop sending the reference clock signal to one of the first link terminus and the second link terminus while maintaining provision of the reference clock signal to the other one of the first link terminus and the second link terminus.

2. The peer-to-peer PCIe system of claim 1, wherein the first link terminus is a PCIe endpoint.

3. The peer-to-peer PCIe system of claim 1, wherein the second link terminus is a PCIe root complex.

4. The peer-to-peer PCIe system of claim 1, further comprising a second switch associated with the reference clock configured to stop sending the reference clock signal to the other one of the first link terminus and the second link terminus while maintaining provision of the reference clock signal to the one of the first link terminus and the second link terminus.

5. The peer-to-peer PCIe system of claim 3, wherein the second link terminus comprises the reference clock.

6. The peer-to-peer PCIe system of claim 1, wherein the reference clock is distinct from the first link terminus and the second link terminus.

7. The peer-to-peer PCIe system of claim 1, wherein the first link terminus and the second link terminus are configured to vote on entry into a low-power state and provision of the reference clock signal is based on the vote.

8. The peer-to-peer PCIe system of claim 1, wherein the reference clock signal is provided to the second link terminus over the PCIe bus.

9. The peer-to-peer PCIe system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *